May 12, 1970  MASANOBU TAKAMATSU ET AL  3,511,345
ENERGY ABSORBER BY MEANS OF PLASTIC DEFORMATION
Filed Feb. 20, 1968  3 Sheets-Sheet 1
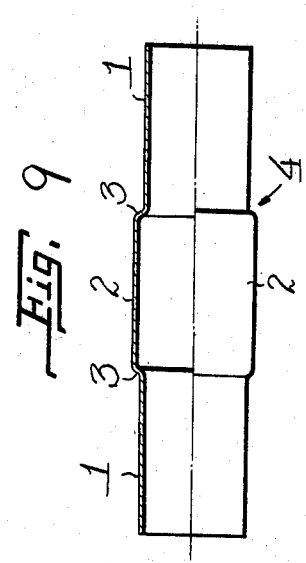
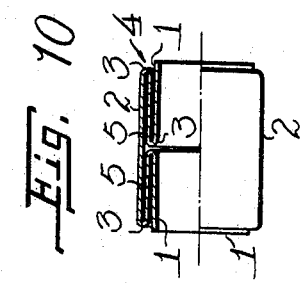
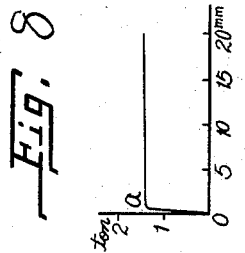
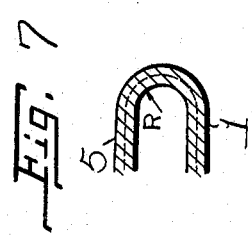
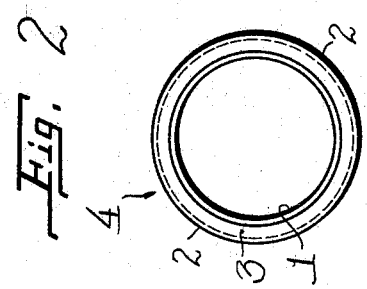
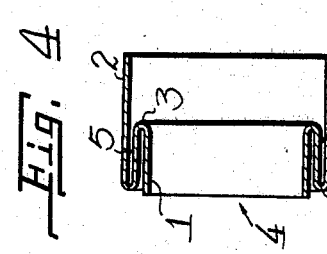
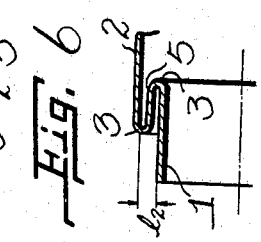
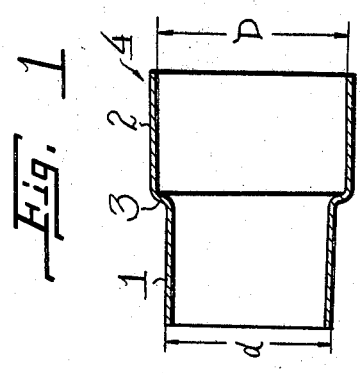
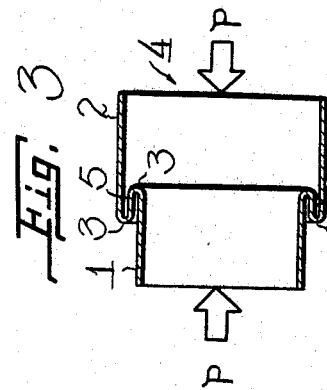
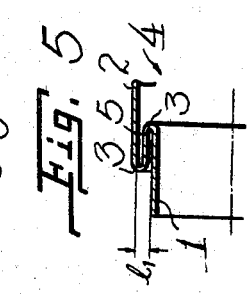

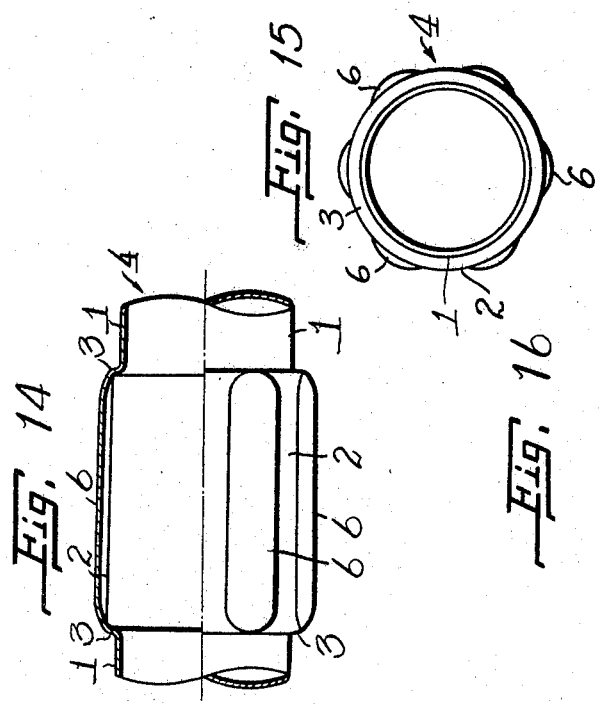

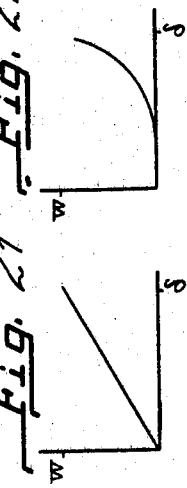
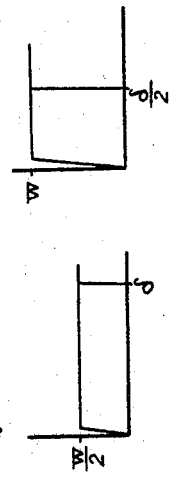
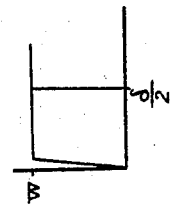
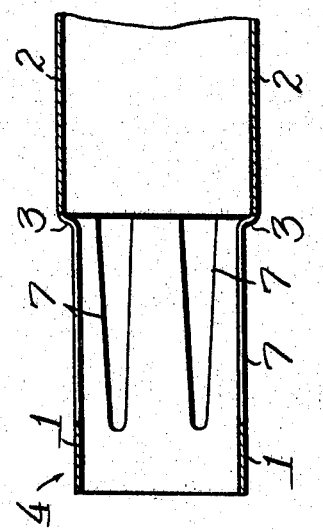

United States Patent Office 3,511,345
Patented May 12, 1970

3,511,345
ENERGY ABSORBER BY MEANS OF
PLASTIC DEFORMATION
Masanobu Takamatsu, Yokohama-shi, and Motoo Ando, Tokyo, Japan, assignors to Tokyu Sharyo Seizo Kabushiki Kaisha, Yokohama-shi, Japan, a corporation of Japan
Filed Feb. 20, 1968, Ser. No. 706,937
Claims priority, application Japan, Feb. 25, 1967, 42/11,950
Int. Cl. F16d 63/00
U.S. Cl. 188—1
12 Claims

ABSTRACT OF THE DISCLOSURE

An energy absorber having at least two axially aligned tubular portions of different diameters joined by a round stepped intermediate portion. Said energy absorber is adapted upon the application of an axially directed compression force on the ends of said energy absorber to permit the plastic deformation of at least one of said tubular portions. The deformed part of said tubular portion defines a tubular region of a diameter intermediate the diameters of the original tubular portions.

---

This invention relates to an energy absorber by means of plastic deformation in which the rigid body will not be fractured by the external force but subjected to successive and permanent deformation, and more particularly the structure and its appended parts of the machine element as an energy absorber in which a certain amount of energy may be absorbed under a certain load with a less reduction of length and there is no spring back after deformation.

In the traffic accidents, especially of the automobile, the projecting elements such as the steering wheel, levers hit the driver at the time of collision and their excess impact force is so strong that it is a hazard to the life of the driver. Moreover in various machines, equipments, etc. excess load or impact causes troubles, malfunctioning or damages to the important parts thereof.

Generally, the spring which is utilized as an energy absorber makes use of elasticity of its material so that a special structure is demanded in order to keep the load at a constant level independent of the load and displacement. Furthermore, when load is completely released, the spring returns its normal position so that its resilient force causes other damages.

In case of the hydraulic type energy absorber wherein the impact energy is absorbed and damped by means of oil or air which is filled within the cylinder and compressed and made to leak through an orifice, there are disadvantages that the structure is rather complicated and that resistance depends on compression speed so that it is difficult to obtain a constant force at any impact speed.

One of the objects of the present invention is to provide an energy absorber by means of plastic deformation simple in construction and inexpensive to manufacture in which the load can be maintained at a constant value and a predetermined amount of energy can be absorbed in a most desirable manner.

A yet further object of the present invention is to provide a method of producing an energy absorber in which the plastic property of the material to be used is fully utilized, each portion of the material is subjected to the continuous and successive deformation and there is no spring back as is the case of the mechanical spring even after releasing the load.

A still further object of the present invention is to provide an energy absorber which is utilized in the connectible portion connecting means and in which the impact force will not exceed a predetermined value, the impact energy is absorbed in the form of the deformation energy of the absorber member and the excess force is prevented from acting on the connected body, whereby useful effects are produced as safety means.

A further object of the present invention is to provide a machine element compact in size, light in weight and inexpensive to provide a machine element compact in size, light in weight and inexpensive to manufacture in which a uniform resistance for ce is developed when compressed, the element will not return to its original shape or spring back even after releasing the load, this resistance force, and load characteristics may be freely selected, the length of compression, may be freely selected in a wide range and in the production of this mechanical element is absorbing energy corresponding to the compressive force and compressive length may be easily adjusted.

The essential features of the present invention reside in the facts that a tubular body made of mild steel, non-ferrous metals or alloy, etc. having suitable resisting force when plastically deformed and suitable ductility is integrally formed through a round stepped portion with a non-deformed tubular portion having a diameter larger or smaller than the effective diameter of said tubular body, and when the compressive force acts on said tubular body in the axial direction thereof, the tubular body is subjected to the successive plastic deformation and folded back to form an intermediate diameter tubular portion.

The energy absorber of the present invention can be utilized in the transport facilities such as automobile, aircraft, railway, etc., in the emergency escape equipments, etc. for maintaining the impact level within a predetermined range and absorbing the energy to ensure the safety of the machine. Moreover the energy absorber can be used in machines for preventing damage to the essential parts of such machines when excess impact force exerts on the interior thereof. Furthermore, the energy absorber of the present invention is not complicated and expensive as the conventional energy absorber wherein the spring or hydraulic means are used in order to absorb the impact energy. That is, the energy absorber of the present invention can be made simple in structure and inexpensive to manufacture. When this energy absorber is subjected to compression, it develops a uniform resisting force and will not spring back to restore its original shape upon releasing the load. This resisting force may be freely selected and the compressed length or the compression ratio may be selected in a wide range. Therefore, the energy absorber of the present invention serves many various purposes as a machine element in the automatic safety device. Furthermore, by making use of the property of the ductile material to absorb the energy upon plastic deformation, the load will not vary suddenly when the material is subjected to compression and a uniform load can be developed for a large compression ratio or reduction. According to the present invention, the desired objects can be obtained effectively by a simple part. Since the stepped portion of the tubular body deforms but the ends of the energy absorber will remain unchanged the energy absorber of the present invention is very convenient as a machine element when assembled. This energy absorber can be formed from a tubular material by applying thereto the impact hydraulic pressure in mass production at a lower production cost.

Now the present invention will be described in more detail with reference to the accompanying drawings in which:

FIG. 1 is a side view with a part broken away;

FIG. 2 is an elevation thereof;

FIGS. 3 and 4 are sectional views with a part broken away illustrating the energy absorber plastically deformed;

FIGS. 5, 6 and 7 are sectional views of FIG. 4;

FIG. 8 shows the relation between the compressive force and amount of compression, this relation showing an example of load characteristics when the compressive force acts on the energy absorber by means of plastic deformation;

FIG. 9 is a sectional side view with a part broken away of another embodiment of the invention;

FIG. 10 is a sectional view with a part broken away of the compressed or deformed energy absorber of FIG. 9;

FIGS. 11 to 18 are sectional views with parts broken away of other embodiments of the present invention;

FIG. 12 is a sectional view illustrating one process of plastic deformation of the energy absorber of FIG. 11;

FIG. 13 is a sectional view illustrating the completely deformed state of the energy absorber thereof;

FIG. 14 is a sectional view of a still another embodiment of the present invention;

FIG. 15 is an elevation thereof;

FIG. 16 is a side view of a yet another embodiment of the present invention;

FIG. 17 is a cross sectional view taken along the line I—I of FIG. 16;

FIG. 18 is a side view of a still further embodiment of the present invention;

FIG. 19 is a load characteristic of the energy absorber by means of plastic deformation shown in FIG. 16 showing the relation between the compressive force and the amount of compression;

FIG. 20 is a load characteristic of the energy absorber by means of plastic deformation shown in FIG. 18, FIGS. 21–24 are graphical representations of the load characteristics of a mechanical spring, a pneumatic spring and two energy absorbers according to the invention, respectively.

In FIGS. 1 to 8, an energy absorber by means of plastic deformation according to the present invention is generally designated by 4 and comprised of a (hollow) tubular body 1 made of, for example, mild steel, non-ferrous metals or alloy, etc. which has suitable ductility so that it develops resisting force when it is under plastic deformation, a non-deformed portion 2 which has a diameter larger than that of the (hollow) tubular body 1 and a wall thickness substantially or nearly same with or larger than that of the (hollow) tubular body 1, and a round stepped portion 3 connecting integrally the tubular body 2 and the larger diameter non-deformed portion 2. Since the energy absorber by means of plastic deformation 4 has such a structure as described above, it may be easily produced, for example, by applying hydraulic pressure to the inner periphery of a length of pipe which has the cross section same with that of the tubular body 1 so as to expand a part of the pipe and then by forming the stepped portion 3 and the larger diameter non-plastic portion 2 in the die. Thus when the compressive force is applied to the (hollow) tubular body 2 in the axial direction thereof, the plastic deformation starts at the stepped portion 3 and continuously develops in the adjacent (hollow) tubular body 1 so that a length of the (hollow) tubular body 1 is caused to fold back, thereby forming a tubular body 5 which has a diameter larger than the tubular body 1, but smaller than the non-deformed portion 2. That is, when the compressive force is applied to the energy absorber 4 by means of plastic deformation from both ends thereof in the axial direction thereof, the region of the tubular body 1 adjacent to the stepped portion is subjected to the continuous and successive plastic deformation so that the tubular portion 5 may be formed.

In the description followed hereinafter, we assume that the outer diameter of the tubular body 1 be $d$ while the inner diameter of the larger diameter non-deformed portion 2 be D. Normally $(D-d)/2$ is so decided that this value is larger than the wall thickness of the tubular body 1. When the compressive force P is applied to both ends of the energy absorber 4 by means of plastic deformation in the axial direction thereof, plastic deformation begins from the region of the tubular body 1 located adjacent to the stepped portion 3 and thus deformed region of the tubular body 1 is caused to protrude into the larger diameter non-deformed portion 2 so that the tubular portion 5 having the diameter between those of the tubular body 1 and the nonplastic portion 2 is formed. Essentially the tubular portion 5 is the plastically deformed region of the tubular body 1 with the inner and outer surfaces of the tubular body 1 being reversed and with an increased diameter. Thus the boundary between the intermediate diameter tubular portion 5 and the tubular body 1 has a naturally rounded form as shown in FIGS. 1 to 4. As described hereinbefore, a portion of the tubular body 1 is folded back to form the tubular portion 5 having an intermediate diameter so that when the tubular body 1 is sufficiently pushed into the larger diameter non-deformed portion 2 the longitudinal length of the energy absorber by means of plastic deformation 4 becomes approximately one half of its original or initial length while the length of the larger diameter portion 2 remains unchanged.

In the process of plastic deformation described above, the region of the tubular body 1 adjacent to the intermediate diameter portion 5 is caused to successively and plastically deform so that the deformation is continuously effected.

The relation between the compressive force and the amount of compression is theoretically shown as indicated in FIG. 8. In the figure, the energy absorber is subjected to the elastic deformation along the line $0a$ so that compressive force is directly proportional to reduction (which is very small in the test). At the point $a$, the energy absorber begins to yield so that the tubular 1 is caused to protrude into the large diameter non-deformed portion 2, thereby forming the intermediate tubular body 5. Thereafter, some region of the tubular body 1 is successively subjected to plastic deformation so that the resistance force is kept constant as shown by the characteristic line $ab$ in FIG. 8. The test was made with the energy absorber made of mild steel pipe 40 mm. in outer diameter and 0.7 mm. in wall thickness and the result is shown in FIG. 8. This result supported the above described theory.

Resistance force depends upon the flow resistance of the material during the compression. Hence the magnitude of the compressive force can be determined according as we select the wall thickness and the diameter of the tubular body 1. In this invention there is still another means of controlling the compressive force which is to be explained directly below.

In FIGS. 5, 6 and 7 when the intermediate tubular portion 5 is formed from the tubular body 1, the mean radius R at the invented portion (best shown in FIG. 7) developed at the boundary between the tubular body 1 and the intermediate portion 5 has influence upon the stress exerted to this portion and deformation resistance or compressive force is dependent of the radius R. The radius R corresponds to $(D-d)/2$ of FIG. 1 and is determined naturally by the gap $l_1$. Therefore, the radius R may be changed according to the smaller gap $l_1$ as in FIG. 5 or to the larger gap $l_2$ as in FIG. 6, so that the compressive force to be applied to the energy absorber may be arbitrarily varied to some extent.

The energy absorber by means of plastic deformation which can reduce its length to a predetermined length may be provided when the lengths of the tubular body 1 and the larger diameter non-deformed portion 2 are suitably determined. Furthermore as shown in FIG. 8 although the amount of the compression in the elastic region 0a is very small, if the energy absorber by means of plastic deformation according to the present invention is compressed so as to form a very small amount of intermediate diameter portion 5 beforehand, the additional compression before the uniform or constant compressive force is obtained may be substantially disregarded when in use. This is more convenient in practice.

In FIG. 8 the energy absorber is subjected to plastic deformation between a and b so that the energy absorber 4 remains deformed even after the compressive force is released and will not spring back to restore its original shape.

In FIGS. 9 and 10 there is shown another energy absorber by means of plastic deformation in which two tubular bodies 2 adapted to deform plastically are integrally connected to both ends of the non-deformed portion 2 through the stepped portions 3. In FIGS. 11, 12 and 13 there is shown still another energy absorber by means of plastic deformation in which such plastically deformable elements as described above are successively arranged and disposed. If need be, such plastically deformable elements may also be arranged and disposed intermittently. The non-deformed portion 2 may be a hollow body having either larger or smaller diameter than that of the tubular body 1. Furthermore according to the purposes of the use of this energy absorber by means of plastic deformation, the plastically deformable tubular body 1 and the non-deformed portion 2 may be freely arranged and disposed in the middle, at one end, at both ends or at several intermediate portions of the energy absorber 4.

For example, in FIG. 11 the cylindrical energy absorber by means of plastic deformation 4 is comprised of a largest diameter non-deformed portion 2, two second largest diameter tubular bodies 1' and 1' disposed at and connected integrally with both ends of the largest diameter non-deformed portion 2 through stepped portions or shoulders 3 and 3 and two smallest diameter tubular bodies 1 and 1 disposed at and connected integrally with the end of the second largest diameter tubular bodies 1' and 1' through stepped portions or shoulders 3' and 3' respectively. The process of plastic deformation of this energy absorber are shown in FIGS. 12 and 13 respectively. When compressive force is applied to this energy absorber, the smallest diameter tubular body 1 begins plastic deformation from its region adjacent to the stepped portion 3'. Then this tubular body 1 forms the intermediate diameter tubular body 5 as shown in FIG. 12, thus absorbing the energy. Thereafter the tubular body 1 protrudes to the stepped portion 3'. When compressive force is further applied to the energy absorber, the outer end of the second largest diameter tubular body 1' adjacent to the stepped portion 3' is exerted by compression so that the second largest diameter tubular body 1' is caused to protrude into the non-deformed portion as shown in FIG. 13. Compression load applied to the second largest diameter tubular body 1' is normally higher than that exerted during the deformation of the smallest diameter tubular body 1. In practice, however, compression force vs. reduction length characteristics as shown in FIG. 8 may be obtained by adjusting the radius R shown in FIG. 7 so as to make the tubular body 1' deformable by compressive force slightly higher than that exerted on the tubular body 1. When the energy absorber by means of plastic deformation is produced as shown in FIG. 11, a large reduction of length compared with the total length of the absorber may be obtained so that considerable energy can be absorbed. When the third, fourth largest diameter tubular bodies are further provided, a further large reduction can be obtained.

In the embodiments shown in FIGS. 14, 15, 16 and 17, rigidity increasing elements 6 are disposed in order to increase the rigidity of the tubular non-deformed portion 2, that is to give sufficient rigidity to the non-deformed portion 2 so that the non-deformed portion 2 can withstand against the compressive force exerting on the energy absorber until plastic deformation of the tubular body 1 is completed, that is until compressive force is released. For example, strip-like ridges are provided on the surface of the non-deformed portion 2 having the large diameter so that the non-deformed portion 2 can have rigidity sufficient enough to withstand against the compressive force until the end of plastic deformation of the tubular body 1. Such ridges are disposed axially of the non-deformed portion 2. In the embodiment shown in FIG. 14, six ridges are provided integrally of the non-deformed tubular portion 2 and may be preferably formed simple at the same time when the large diameter portion 2 is formed.

In the embodiments shown in FIGS. 16 and 17, and 18, a plurality of parallel or tapered apertures 7 are provided axially of the tubular body 1 for reducing compressive force. Therefore the compressive force of the energy absorber 4, will be lowered. FIG. 19 shows the load characteristics of this embodiment. The 0ab indicates the load line when no apertures 7 are provided while the 0cd, the load line when apertures 7 are provided. Thus by suitable determining the width, or the area of the aperture 7, the compressive force can be adjusted to a predetermined value. In case of the tapered aperture, it is preferable that the aperture 7 has the widest portion in the vicinity of the stepped portion 3 and is converging toward the outer end of the tubular body 1. In this case, the load characteristics is shown in FIG. 20 wherein the first compressive force developed at the time of impact can be selected at a comparatively small value, so that the tapered aperture may be used when a special effect is desired. Generally when the impact load exerts on the material, it deforms at a high speed at the initial stage of impact so that the deformation resistance is raised, thus increasing the deformation compressive force at the beginning of deformation. In this case, when the energy absorber is constructed as shown in FIG. 18, the compressive force may be maintained all the way at a substantially same level. Furthermore, according to the configuration of the tapered aperture as shown in FIG. 18, any desired load vs. reduction characteristics may be more freely controlled. Moreover, instead of the above described ridge, the independent projections in the shape of ring, angular body or a part of sphere or the combination thereof with the ridge may be provided at the inner or outer surface of the main body in my suitable arrangement (thus forming a long tubular body).

In any case, the additional elements 6 or 7 may be selectively provided in the energy absorber by means of plastic deformation 4 in the manner described hereinbefore. The cross section of the energy absorber may be circular elliptic or the combination of circle, ellipse, on plane with any other configuration such as polygon, arch, etc. The energy absorber may be provided with the flange-like flat portions at the both ends integrally or detachably connected with the energy absorber so that the energy absorber may be coupled to any suitable element in a simple manner.

In practice the energy absorbed by means of plastic deformation according to the present invention is preferable because when this energy absorber 4 is exerted by compressive force the smaller diameter tubular body 1 provided at the end or ends of the absorber, especially its region adjacent to the stepped portion 3, begin plastic deformation and folds back (for example, when the resistance in the plastic deformation in the vicinity of the stepped portion 3 is 1.4 ton, the simple compressive force exerting on the tubular body 1 is more than 2 ton), and because the end of the tubular body 1 as well as the whole structure of the non-deformed portion 2 will not be subjected to plastic deformation while the folding-back-plastic-deformation is going on. Thus in the energy absorber of the present invention, a considerable amount of energy may be absorbed under a predetermined load with a less reduction and the energy absorber will not spring back. Therefore, the energy absorber of the present invention has the most desirable characteristics as an energy absorber, permits to select freely the amount of length reduction ratio under the limited load and undergoes permanent plastic deformation. When an energy absorber such as spring in which the compressive force is not constant is utilized, its load vs. reduction characteristics may be shown by FIGS. 21-A and B. In this case, the absorbed energy may be represented by the triangle shown in the figures. However, in the energy absorbed of the present invention, reduction or displacement is same while the load is one half as shown in FIG. 21-C. This means that the load at the time of collision may be reduced to one half so that hazard may be eliminated. Moreover, as shown in FIG. 21-D, when the allowable limit load is equal, the same amount of energy may be absorbed by one half of the reduction or displacement. Therefore, the present invention provides an energy absorber by means of plastic deformation compact in size, light in weight and inexpensive to manufacture. Furthermore, the energy absorber of the present invention will not spring back after the collision and incur further damage.

When this energy absorber by means of plastic deformation is utilized in the automobile the impact force at the time of the collision of the automobile running at a high speed will not exceed the load determined by load vs. reduction characteristics of this absorber and the impact energy is absorbed by the displacement of the energy absorber, thus offering the most useful traffic safety means.

What we claim is:

1. An energy absorber comprising a tubular body having a first tubular portion of a first diameter; a second tubular portion axially aligned with said first tubular portion and of a second diameter different from said first diameter and a round stepped intermediate portion interconnecting the adjacent inner ends of said first and second portions, said tubular body being adapted to permit, upon the application of an axial compression force thereon, the plastic deformation of at least one of said tubular portions commencing in the region of the intersection of said tubular portion and said intermediate portion to define, after deformation, a segment of said tubular portion having a diameter intermediate between said first and second tubular portions and in overlapping relation with at least some of the other of said tubular portions and the undeformed segment of said deformed tubular portion.

2. An energy absorber as recited in claim 1, wherein said tubular body includes a third tubular portion axially aligned with said first and second tubular portions and of a third diameter different from said second diameter and a further intermediate portion interconnecting the adjacent ends of said second and third tubular portions, said tubular body being adapted to permit, upon the application of an axially directed compression force thereon, the plastic deformation of at least one of said second and third tubular portions commencing in the region of the intersection of said one tubular portion and said further intermediate portion to define a deformed segment of said one deformed tubular body having a diameter intermediate said second and third diameters and disposed in overlapping relation with at least some of said second and third tubular portions.

3. An energy absorber as recited in claim 2, wherein said first and third diameters are both larger or smaller than said second diameter.

4. An energy absorber as recited in claim 3, wherein at least said first and third tubular portions are plastically deformable.

5. An energy absorber as recited in claim 2, wherein said first diameter is larger than said second diameter and said second diameter is larger than said third diameter.

6. An energy absorber as recited in claim 5, wherein two adjacent of said tubular portions are both plastically deformable.

7. An energy absorber as recited in claim 1, wherein upon the application of said compression force, a rounded segment is defined in said deformed tubular portion interconnecting said deformed segment of said deformed tubular portion in the remaining segment thereof, the magnitude of said compression force necessary for deformation being dependent on the mean radius of said rounded segment.

8. An energy absorber as recited in claim 1, wherein said first tubular portion is formed with a plurality of apertures in the wall thereof, said first tubular portion being deformed upon the application of said compression force, the magnitude of said compression force required to successively deform each transverse region of said first tubular portion being dependent upon the extent of said apertures within said region.

9. An energy absorber as recited in claim 1, inculding reinforcing means disposed on said first tubular portion to prevent the plastic deformation thereof without interferring with the plastic deformation of said second tubular portion.

10. An energy absorber as recited in claim 9, wherein said reinforcing means comprises ridges in the wall of said first tubular portion, said ridges extending at least in part in an axial direction and formed by displacing sections of said first tubular portion wall in a radial direction.

11. An energy absorber comprising a tubular body having a plurality of axially aligned adjacent tubular portions, each of said tubular portions being of a diameter different from the diameter of the tubular portions adjacent thereto; and a plurality of round stepped intermediate portions, one of said intermediate portions interconnecting the adjacent ends of each adjacent pair of said tubular portions, said tubular body being adapted, upon the application of an axial compression force thereto, to permit at least some of said tubular portions to plastically deform commencing in the region of the intersection between said deformable tubular portions and the intermediate portions associated therewith to define in each of said deformable portions a deformed segment of a diameter intermediate of the diameters of said deformable tubular portion and the adjacent tubular portion joined thereto by said intermediate portion, said deformed segment being disposed between at least some of the remaining segment of said deformable tubular portion and the adjacent tubular portion in overlapping relation therewith.

12. An energy absorber as recited in claim 11, wherein each of a group of adjacent tubular portions is of a larger diameter than the next tubular portion in said group to define a tubular body having, at least in part, a step-like configuration.

References Cited
UNITED STATES PATENTS

| 3,146,014 | 8/1964 | Kroell. |
| 3,339,674 | 9/1967 | Kroell et al. |
| 3,428,150 | 2/1969 | Muspratt. |

DUANE A. REGER, Primary Examiner

U.S. Cl. X.R.

74—492; 293—70